(12) United States Patent
Kim et al.

(10) Patent No.: US 12,158,913 B2
(45) Date of Patent: Dec. 3, 2024

(54) METHOD AND APPARATUS OF IMAGE/VIDEO FEATURE DESCRIPTOR EXTRACTING FOR SEARCHING IMAGE/VIDEO

(71) Applicant: Electronics and Telecommunications Research Institute, Daejeon (KR)

(72) Inventors: Joon Soo Kim, Daejeon (KR); Joung Il Yun, Daejeon (KR); Geun Taek Lim, Goyang-si (KR); Won Jo, Seoul (KR); Yu Kyung Choi, Seoul (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 18/298,208

(22) Filed: Apr. 10, 2023

(65) Prior Publication Data

US 2024/0020335 A1    Jan. 18, 2024

(30) Foreign Application Priority Data

Jul. 18, 2022    (KR) .......................... 10-2022-0087969

(51) Int. Cl.
*G06F 16/50*    (2019.01)
*G06F 16/583*    (2019.01)
(Continued)

(52) U.S. Cl.
CPC ........ *G06F 16/7328* (2019.01); *G06F 16/583* (2019.01); *G06F 16/783* (2019.01); *G06V 10/771* (2022.01); *G06V 10/82* (2022.01)

(58) Field of Classification Search
CPC ... G06F 16/7328; G06F 16/583; G06F 16/783
See application file for complete search history.

(56) References Cited

U.S. PATENT DOCUMENTS

| 2021/0014540 A1 | 1/2021 | Duan et al. |
| 2021/0365724 A1 | 11/2021 | Lee et al. |
| 2022/0108127 A1 | 4/2022 | Choi et al. |

FOREIGN PATENT DOCUMENTS

| KR | 10-1601755 | 3/2016 |
| KR | 10-1801846 | 11/2017 |

OTHER PUBLICATIONS

Yihang Lou et al., Compact Deep Invariant Descriptors for Video Retrieval, 2018 [retrieved Mar. 7, 2024], 2017 Data Compression Conference. Retrieved from the Internet: https://web.archive.org/web/20180623003955/https://ieeexplore.ieee.org/document/7923715/ (Year: 2018).*

(Continued)

*Primary Examiner* — Kristopher Andersen
(74) *Attorney, Agent, or Firm* — KILE PARK REED & HOUTTEMAN PLLC (57) ABSTRACT

The present disclosure discloses an image/video feature descriptor extraction method and apparatus for image/video search. An image/video feature descriptor extraction method may comprise obtaining a search requested image/video from a user, performing spatio-temporal transformation on the search requested image/video, extracting a feature map from the image/video subjected to the spatio-temporal transformation, and extracting an image/video feature descriptor by applying TNIP (Temporal Nested Invariance Pooling) to the feature map.

9 Claims, 9 Drawing Sheets

(51) Int. Cl.
  *G06F 16/70*    (2019.01)
  *G06F 16/732*   (2019.01)
  *G06F 16/783*   (2019.01)
  *G06V 10/771*   (2022.01)
  *G06V 10/82*    (2022.01)

(56) References Cited

OTHER PUBLICATIONS

Zhili Zou et al., Video Copy Detection Using Spatio-Temporal CNN Features, 2019 [retrieved Mar. 7, 2024], IEEE Access, vol. 7, pp. 100658-100665. Retrieved from the Internet: https://ieeexplore.ieee.org/abstract/document/8767987 (Year: 2019).*

Jo, W., Lim, G., Kim, J., Yun, J., Choi, Y. (2022). Exploring the Temporal Cues to Enhance Video Retrieval on Standardized CDVA. IEEEAccess, 10, 38973-38981. 10.1109/ACCESS.2022.3165177.

* cited by examiner

METHOD AND APPARATUS OF IMAGE/VIDEO FEATURE DESCRIPTOR EXTRACTING FOR SEARCHING IMAGE/VIDEO

TECHNICAL FIELD

The present disclosure relates to a method and apparatus for extracting image/video feature descriptors for image/video search.

BACKGROUND ART

Content-based image/video search is a technology for searching an image/video related to a search requested image/video based on information in an image or video.

CDVS (Compact Descriptors for Visual Search), a standard technology for extracting image/video descriptors, was developed in MPEG for image/video search based on visual similarity, and this was also adopted in CDVA (Compact Descriptors for Video Analysis), a standard technology for extracting image/video descriptors. CDVA selects key frames from images or a video and then extracts CDVS descriptors for these frames. Recently, thanks to the development of image/video recognition technology, more improved recognition performance may be expected by simultaneously analyzing a bundle of frames rather than a key frame unit. Accordingly, in addition to spatial transformation invariance for a single input frame, a technique for extracting image/video features that are invariant to spatio-temporal transformation for a plurality of input frames is being studied. The present disclosure relates to a method for extracting image/video features that are robust to spatio-temporal transformations of predefined categories.

DISCLOSURE

Technical Problem

An object of the present disclosure is to extract visual feature information of an image/video in order to search for an image/video similar to a search requested image/video.

In addition, an object of the present disclosure is to extract deep feature descriptors having robustness to temporal transformation through image/video feature aggregation considering various spatio-temporal transformations.

In addition, an object of the present disclosure is to extract an image/video feature descriptor of a desired length from a collection of feature maps extracted from a plurality of images or video frames.

In addition, an object of the present disclosure is to induce an extracted descriptor to have invariance to spatial and temporal transformation of input data.

The technical problems to be achieved in the present disclosure may not be limited to the technical problems mentioned above, and other technical problems not mentioned may be clearly understood by those skilled in the art from the description below.

Technical Solution

According to an embodiment of the present disclosure, a method and apparatus for extracting an image/video feature descriptor for image/video search are disclosed.

An image/video feature descriptor extraction method according to an embodiment of the present disclosure may comprise obtaining a search requested image/video from a user; performing spatio-temporal transformation on the search requested image/video; extracting a feature map from the image/video subjected to the spatio-temporal transformation; and extracting an image/video feature descriptor by applying TNIP (Temporal Nested Invariance Pooling) to the feature map.

According to an embodiment of the present disclosure, wherein extracting of the image/video feature descriptor may comprise performing a series of pooling operations.

According to an embodiment of the present disclosure, wherein performing of the series of pooling operations may perform at least one of spatio-temporal region pooling, intra-scale pooling, multi-scale pooling, or spatio-temporal transform pooling.

According to an embodiment of the present disclosure, wherein the feature map may be extracted using an image/video processing filter.

According to an embodiment of the present disclosure, wherein the feature map is extracted using various artificial neural networks.

According to an embodiment of the present disclosure, wherein the feature map may have at least one space-time dimension or a channel dimension.

According to an embodiment of the present disclosure, wherein the spatio-temporal transformation of the search requested image/video may be performed through a collection of predefined image/video transformation functions.

According to an embodiment of the present disclosure, wherein the spatio-temporal transformation may perform at least one of spatial transformation or temporal transformation.

According to an embodiment of the present disclosure, wherein each image/video to which the spatio-temporal transformation is applied may be input to a same image/video feature extraction network to extract a feature map.

According to an embodiment of the present disclosure, wherein a plurality of 4D feature maps may be extracted through an image/video input to the network.

According to an embodiment of the present disclosure, wherein the spatio-temporal region pooling may pool a predefined space-time window along a space-time axis.

According to an embodiment of the present disclosure, wherein the spatio-temporal region pooling may use two or more different space-time windows.

According to an embodiment of the present disclosure, wherein the spatio-temporal region pooling may perform p-norm pooling (default: p=2) for a given space-time window.

According to an embodiment of the present disclosure, wherein the intra-scale pooling may perform p-norm pooling (default: p=∞) again on vectors pooled by the spatio-temporal region pooling.

According to an embodiment of the present disclosure, wherein the multi-scale pooling may perform p-norm pooling (default: p=1) on vectors pooled by the intra-scale pooling for all window scales.

According to an embodiment of the present disclosure, wherein the spatio-temporal transform pooling may obtain a TNIP image/video feature descriptor by performing p-norm pooling (default: p=∞) on vectors pooled by the multi-scale pooling for different spatio-temporal transform indices.

An image/video feature descriptor extraction apparatus according to an embodiment of the present disclosure may comprise a search requested image/video acquisition unit obtaining a search requested image/video from a user; a spatio-temporal transform unit performing spatio-temporal transformation on the search requested image/video; a feature map extraction unit extracting a feature map from the image/video subjected to the spatio-temporal transformation; and a TNIP performing unit extracting an image/video feature descriptor by applying TNIP (Temporal Nested Invariance Pooling) to the feature map.

According to one embodiment of the present disclosure, wherein the TNIP performing unit may perform a series of pooling operations, According to one embodiment of the present disclosure, wherein the series of pooling operations may perform at least one of spatio-temporal region pooling, intra-scale pooling, multi-scale pooling, or spatio-temporal transform pooling.

According to one embodiment of the present disclosure, wherein the spatio-temporal transformation of the search requested image/video may be performed through a collection of predefined image/video transformation functions.

The features briefly summarized above with respect to the disclosure are merely exemplary aspects of the detailed description of the disclosure that follows, and do not limit the scope of the disclosure.

Advantageous Effects

According to the present disclosure, in order to search for an image/video similar to a search requested image/video, visual feature information of an image/video may be extracted.

According to the present disclosure, an image/video feature descriptor having robustness to temporal transformation may be extracted through image/video feature aggregation considering various spatio-temporal transformations.

According to the present disclosure, the extracted descriptor may be induced to have invariance to spatial and temporal transformation of input data.

According to the present disclosure, image/video feature extraction for image/video search may be performed more robustly through invariance of spatial and temporal transformation of input data.

Effects obtainable in the present disclosure may not be limited to the effects mentioned above, and other effects not mentioned may be clearly understood by those skilled in the art from the description below.

MODE FOR INVENTION

Hereinafter, embodiments of the present disclosure will be described in detail with reference to the accompanying drawings in this specification so that those of ordinary skill in the art to which the present disclosure pertains may easily carry out. However, the present disclosure may be embodied in several different forms and is not limited to the embodiments described herein.

In describing the embodiments of the present disclosure, if it is determined that a detailed description of a known configuration or function may obscure the gist of the present disclosure, the detailed description thereof will be omitted. In addition, in the drawings, parts irrelevant to the description of the present disclosure are omitted, and similar reference numerals are attached to similar parts.

In the present disclosure, when an element is said to be "connected" or "coupled" to another element, this may include not only a direct connection relationship, but also an indirect connection relationship in which another element exists in the middle. In addition, when an element "includes" or "has" another element, this means that it may further include another element without excluding other elements unless otherwise stated.

In the present disclosure, terms such as first and second are used only for the purpose of distinguishing one element from another, and do not limit the order or importance of elements unless otherwise specified. Accordingly, within the scope of the present disclosure, the first element may be referred to as a second element in another embodiment, and similarly, a second element in one embodiment may be referred to as a first element in another embodiment.

In the present disclosure, elements that are distinguished from each other are only for clearly explaining each characteristic, and do not necessarily mean that the elements are separated. That is, a plurality of elements may be integrated to form a single hardware or software unit, or a single element may be distributed to form a plurality of hardware or software units. Accordingly, even such integrated or distributed embodiments are included in the scope of the present disclosure, even if not mentioned separately.

In the present disclosure, elements described in various embodiments do not necessarily mean essential elements, and some may be optional elements. Therefore, an embodiment composed of a subset of elements described in one embodiment is also included in the scope of the present disclosure. In addition, embodiments including other elements in addition to the elements described in various embodiments are also included in the scope of the present disclosure.

In the present disclosure, expressions of positional relationships used herein, such as top, bottom, left, right, etc., are described for convenience of explanation, and when viewing the drawings shown in this specification in reverse, the positional relationship described in the specification may be interpreted in the opposite way.

The present disclosure relates to a method and apparatus for extracting image/video feature descriptors for image/video search. Specifically, the present disclosure relates to a method of extracting feature information of an image/video to search a database for an image/video visually similar to a search requested image/video. A content-based image/video search method and apparatus according to the present disclosure is a technology for search searching an image/video related to a search requested image/video based on information in an image or video. The content referred to herein may include all information such as subtitles and audio in addition to visual information of an image/video. Here, when the search target is an image/video, visual similarity may play a very important role in many cases. The present disclosure also relates to image/video search based on visual similarity, and accordingly, a technique for extracting visual features of an image/video will be described below.

The image/video feature descriptor extraction method for image/video search according to the present disclosure includes CDVS(Compact Descriptors for Visual Search), which is a standard technology for extracting image/video descriptors for image/video search based on visual similarity, and CDVA Compact Descriptors for Video Analysis), which is a standard technology for extracting image/video descriptors.

The CDVS descriptor may be composed of a Fisher vector combining local feature point information extracted from an image/video and local feature point descriptors. Here, local feature point information may be coordinates and/or HoG descriptors. In addition, the Fisher vector may summarize the global visual characteristics of the image/video, and the overall similarity of the image/video may be measured by calculating the similarity of the Fisher vector. The local feature point information may be used for geometric verification of an image/video with a high overall similarity, and through this, an image/video may be searched with higher accuracy. The present disclosure may include such technical content.

The CDVA may select key frames from images or a video and then extract CDVS descriptors for these frames. Here, the key frames may be selected in a manner of excluding frames having a similar color histogram to a certain level among frames extracted at regular intervals. In addition, in order to efficiently encode several descriptors, segment division based on image/video similarity, predictive encoding in a segment, and the like may be applied. On the other hand, CDVA may extract a deep feature descriptor for each key frame in addition to an existing CDVS descriptor and include it in a CDVA descriptor bitstream. Here, the deep feature descriptor may be an image/video feature vector of a fixed length for each key frame. In addition, the deep feature descriptor may be extracted using an arbitrary artificial neural network. A CDVA header may include metadata about an artificial neural network used for deep feature descriptor extraction. Accordingly, a receiving side of a search request may determine the compatibility of a deep image/video feature vector. In addition, CDVA may calculate a 512-dimensional vector by pooling an output of a pool5 layer of a VGG16 network. In particular, a basic deep image/video feature vector may adopt a NIP method to ensure robustness of a certain level or more against spatial transformation (scale, rotation, translation, etc.). Although NIP is described for an output of a 2D CNN (Convolutional Neural Network), it may also be applied to a 3D CNN structure that is widely used for image/video recognition as long as deep feature descriptors corresponding to each key frame are extracted.

Thanks to the development of image/video recognition technology, further improved recognition performance may be expected by simultaneously analyzing a bundle of frames rather than a key frame unit. Accordingly, in addition to spatial transformation invariance for a single input frame, a technique for extracting image/video features that are invariant to spatio-temporal transformation for a plurality of input frames is being studied. Hereinafter, an image/video feature descriptor extraction method that is robust to spatio-temporal transformation of a predefined category will be described with reference to drawings.

Figure 1:
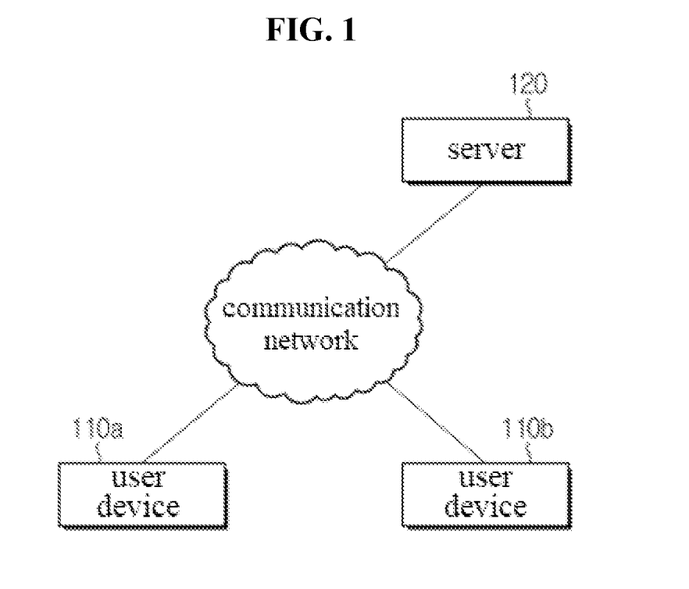
FIG. 1 is a diagram showing a structure of a system that provides a method for extracting image/video feature descriptors for image/video search.

FIG. 1 is a diagram showing a structure of a system that provides a method for extracting image/video feature descriptors for image/video search according to the present disclosure.

Referring to FIG. 1, a system includes a user device 110A, a user device 110B, and a server 120 connected to a communication network. Although FIG. 1 illustrates two user devices 110A and 110B, three or more user devices may exist.

A user device 110A and a user device 110B are used by a user who wants to extract image/video feature descriptors for image/video search using a platform according to an embodiment of the present disclosure. User devices 110A and 110B may acquire input data (e.g., a search request image/video, etc.), transmit the input data to a server 120 through a communication network, and interact with the server 120. Each of user devices 110A and 110B may include a communication unit for communication, a storage unit for storing data and programs, a display unit for displaying information, an input unit for user input, and a processor for control. For example, each of user devices 110A and 110B may be a general-purpose device (e.g., a smart phone, a tablet, a laptop computer, a desktop computer) installed with an application or program for accessing a platform, or a terminal dedicated to accessing a platform.

A server 120 provides a platform according to embodiments of the present disclosure. A server 120 may provide various functions for an image/video feature descriptor extraction platform and may operate an artificial intelligence model. An example of an artificial neural network applicable to the present disclosure will be described with reference to FIG. 2 below. In addition, a server 120 may perform learning for the artificial intelligence model using the learning data. According to various embodiments of the present disclosure, a server 120 stores a plurality of artificial intelligence models for various analysis tasks included in an image/video feature descriptor extraction procedure for image/video search, and selectively uses at least one of the artificial intelligence models as needed. Here, a server 120 may be a local server existing in a local network or a remote access server (e.g., a cloud server) connected through an external network. A server 120 may include a communication unit for communication, a storage unit for storing data and programs, and a processor for control.

Figure 2:
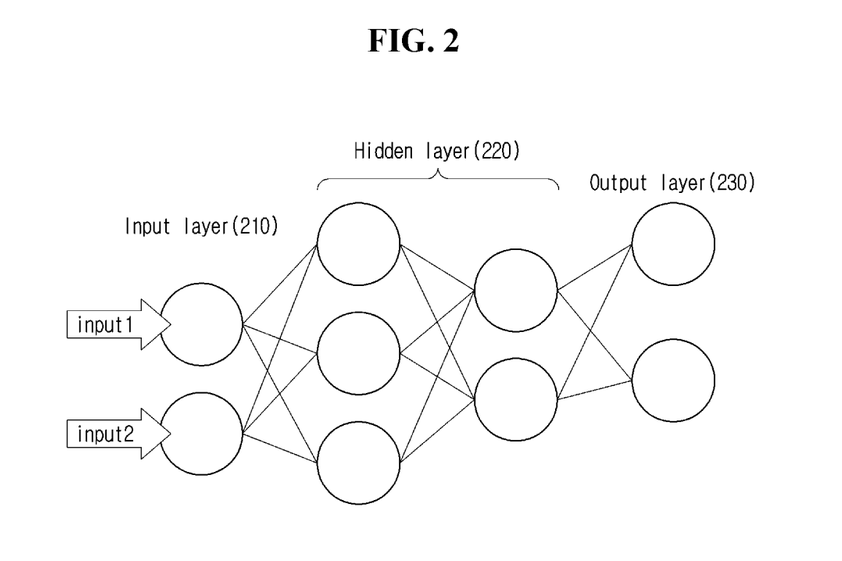
FIG. 2 is a diagram showing a structure of an artificial neural network applicable to the system.

FIG. 2 is a diagram showing a structure of an artificial neural network applicable to the system.

An artificial neural network as shown in FIG. 2 may be understood as a structure of artificial intelligence (AI) models stored in a server 120. Referring to FIG. 2, an artificial neural network includes an input layer 210, at least one hidden layer 220, and an output layer 230. Each of layers 210, 220, and 230 is composed of a plurality of nodes, and each node is connected to an output of at least one node belonging to a previous layer. Each node transmits an output value obtained by multiplying a value calculated by performing an inner product of each output value of nodes in a previous layer and a corresponding connection weight by a non-linear activation function to at least one neuron in a next layer.

The artificial neural network shown in FIG. 2 may be formed by learning (e.g., machine learning, deep learning, etc.). In addition, an artificial neural network model used in various embodiments of the present disclosure may include at least one of Fully convolutional neural network, convolutional neural network, recurrent neural network, restricted Boltzmann machine (RBM) or deep belief neural network (DBN), but is not limited thereto. Alternatively, machine learning methods other than deep learning may also be included. Alternatively, it may include a hybrid model combining deep learning and machine learning. For example, by applying a deep learning-based model, features of an image/video are extracted, and a machine learning-based model may be applied when an image/video is classified or recognized based on extracted features. The machine learning-based model may include a Support Vector Machine (SVM), AdaBoost, and the like, but is not limited thereto.

Figure 3:
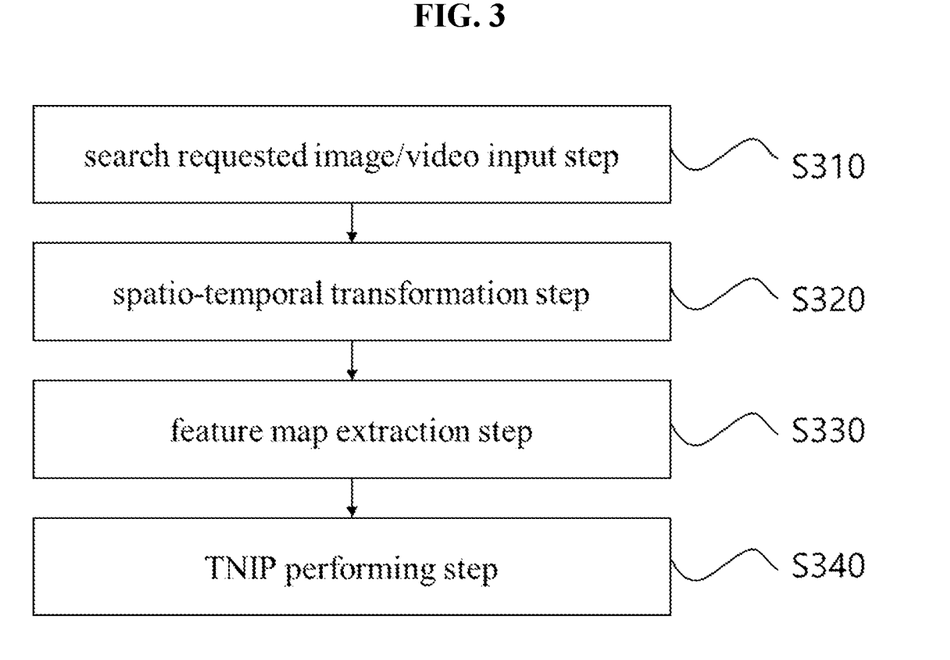
FIG. 3 is a diagram showing an image/video feature descriptor extraction flowchart.

FIG. 3 is a diagram showing an image/video feature descriptor extraction flowchart.

The image/video feature descriptor extraction process according to the present disclosure may include a search requested image/video input step (S310), a spatio-temporal transformation step (S320), a feature map extraction step (S330), and a TNIP performing step (S340).

An image/video feature descriptor extraction device according to the present disclosure performing an image/video feature descriptor extraction process may be, for example, a server 120 or user devices 110A and 110B. For example, a server 120 or another user device 110B may perform an image/video feature descriptor extraction process of FIG. 3 in response to an image/video search request of the user device 110A. In another embodiment, it is also possible for the user devices 110A and 110B to perform an image/video feature descriptor extraction process of FIG. 3 in response to an image/video search request of the server 120.

Referring to FIG. 3, in step S310, an apparatus for extracting an image/video feature descriptor according to the present disclosure may receive a search requested image/video. Here, the search requested image/video may be input by an user. In addition, all or part of the search requested image/video input to the device may be a collection of short images or a short video having a fixed length. A search requested image/video in the present disclosure may be referred to as 'Query' or another term having an equivalent technical meaning. In addition, short images or a short video referred to in the present disclosure may be referred to as a 'clip' or another term having an equivalent technical meaning.

In step S320, the device may perform spatio-temporal transformation on a search requested image/video. Spatio-temporal transformation of a search requested image/video may be performed through a collection of predefined image/video transformation functions. In addition, a spatio-temporal transformation may include one of a spatial transformation, a temporal transformation, or a combination of the two transformations. A spatio-temporal transformation process according to the present disclosure will be described later with reference to FIGS. 4A and 4B.

In step S330, the device may extract a feature map. Specifically, each of the image/video subjected to spatio-temporal transformation in step S320 may be input to an image/video feature extraction network. In this case, all of the image/video feature extraction networks may be the same network, but are not limited thereto. Accordingly, the device may extract a plurality of 4-dimensional feature maps. A detailed 4D feature map extraction process will be described later with reference to FIG. 4C.

In step S340, the device may perform TNIP. Specifically, the device may extract an image/video feature descriptor by applying TNIP to the feature maps extracted in step S330. Here, TNIP may be a series of pooling operations applied to feature maps. A detailed method of performing TNIP will be described later with reference to FIGS. 4D and 4E.

According to an embodiment of the present disclosure, an entire image/video from which image/video features are to be extracted may be expressed as a set of frames $X=\{x_i|i=0, 1, 2, \ldots\}$. Accordingly, an image/video feature descriptor may be extracted for an entire image/video or a subset of X. For example, a subset may be selected t frames at a predetermined interval (I) before and after the key frames selected in the CDVA reference software. Hereinafter, a specific image/video feature descriptor extraction method will be described.

Figure 4A:
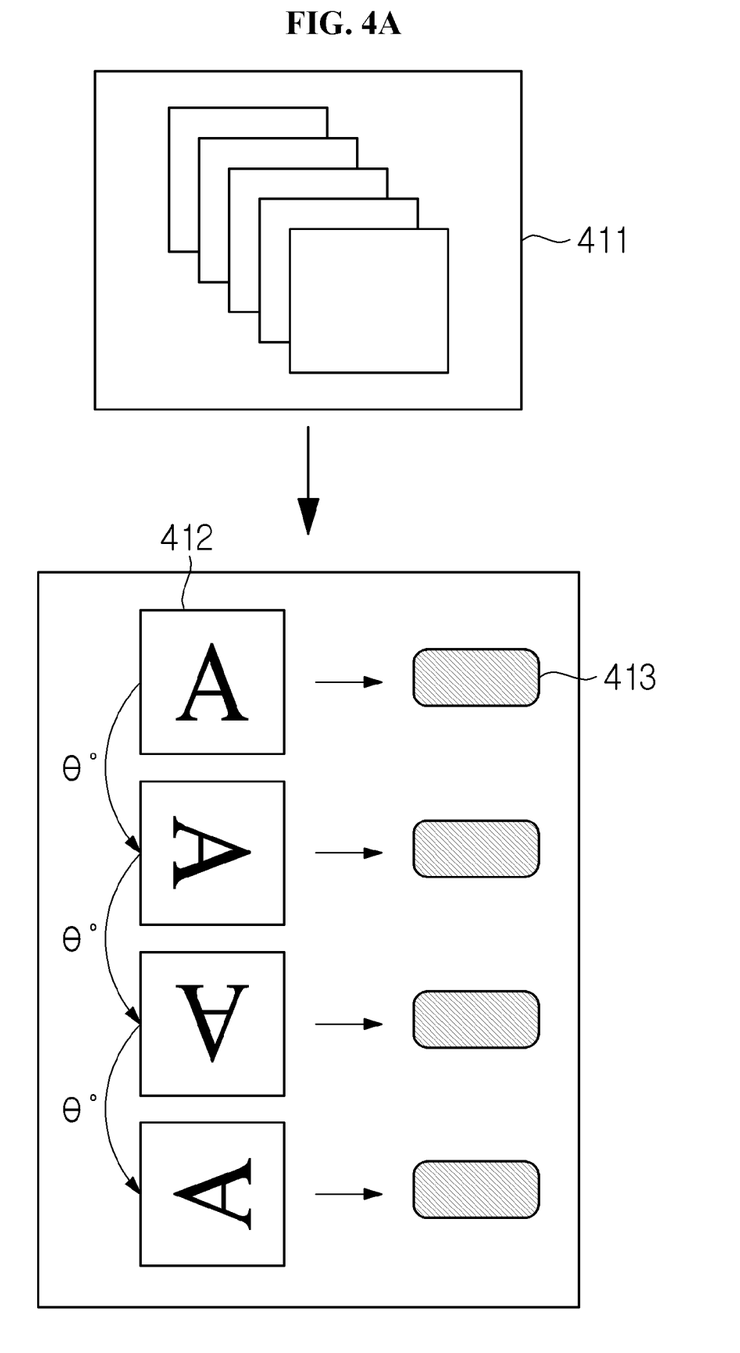
FIG. 4A is a diagram showing a process of spatial transformation of a search requested image/video.

FIG. 4A is a diagram showing a process of spatial transformation of a search requested image/video.

Specifically, an image/video feature descriptor extraction apparatus according to the present disclosure may perform spatial transformation on an input clip image/video 411. For example, to perform spatial transformation, the device may rotate each frame 412 constituting a clip image/video 411 by 360/N degrees.

Figure 4B:
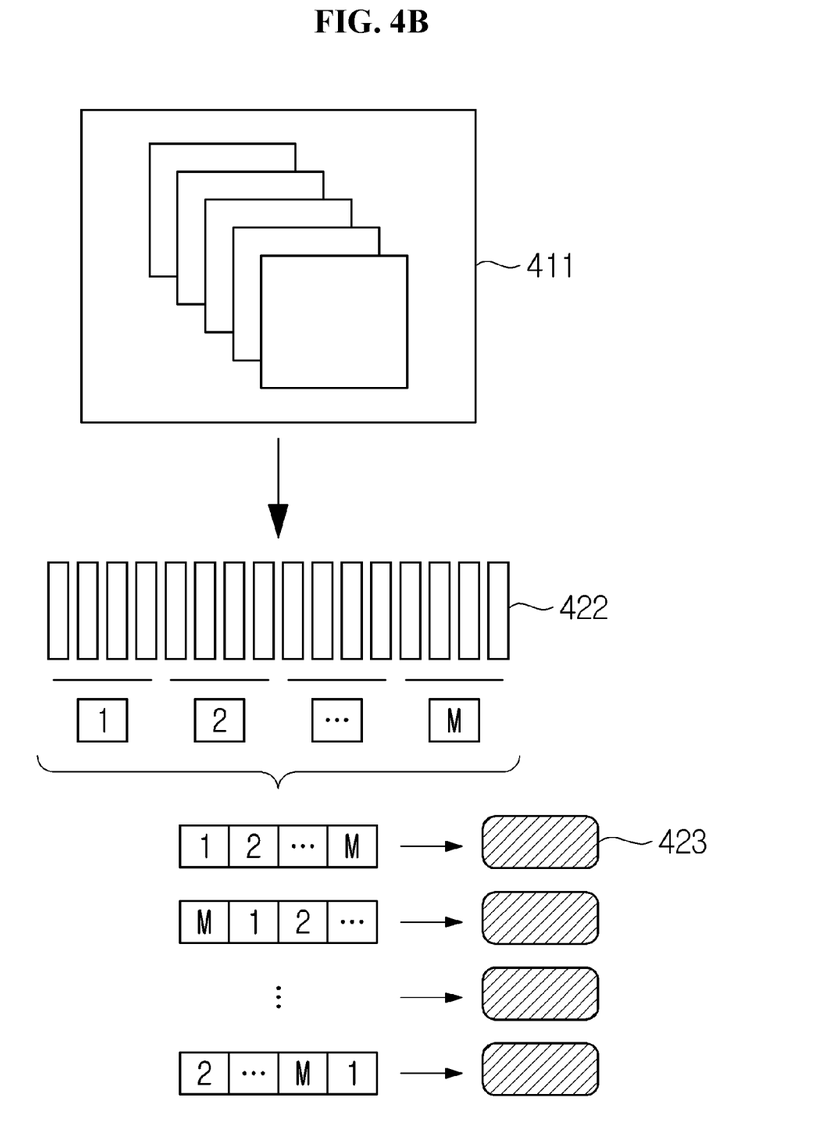
FIG. 4B is a diagram showing a process of temporal transformation of a search requested image/video.

FIG. 4B is a diagram showing a process of temporal transformation of a clip image/video.

Specifically, an image/video feature descriptor extraction apparatus according to the present disclosure may perform temporal transformation on an input clip image/video 411. For example, to perform temporal transformation, the device may divide a frameset 422 constituting a search requested image/video into M sections. In addition, the device may obtain M clips 423 by applying circular shuffle to the divided M frames. Here, in the process of applying cyclic shuffling, one clip may be obtained by arranging a frame bundle of the last section to the front for each frame bundle divided into M sections. M clips 423 may be acquired by repeatedly performing this rule. Accordingly, the M clips 423 may be used in a feature map extraction process thereafter. That is, the apparatus may perform a feature map extraction process using a total of N+M clips obtained by adding the N clips 413 obtained through spatial transformation and the M clips 423 obtained through temporal transformation. According to another embodiment of the present disclosure, a feature map extraction process may be performed using N or M clips by performing only one of spatial transformation and temporal transformation.

Figure 4C:
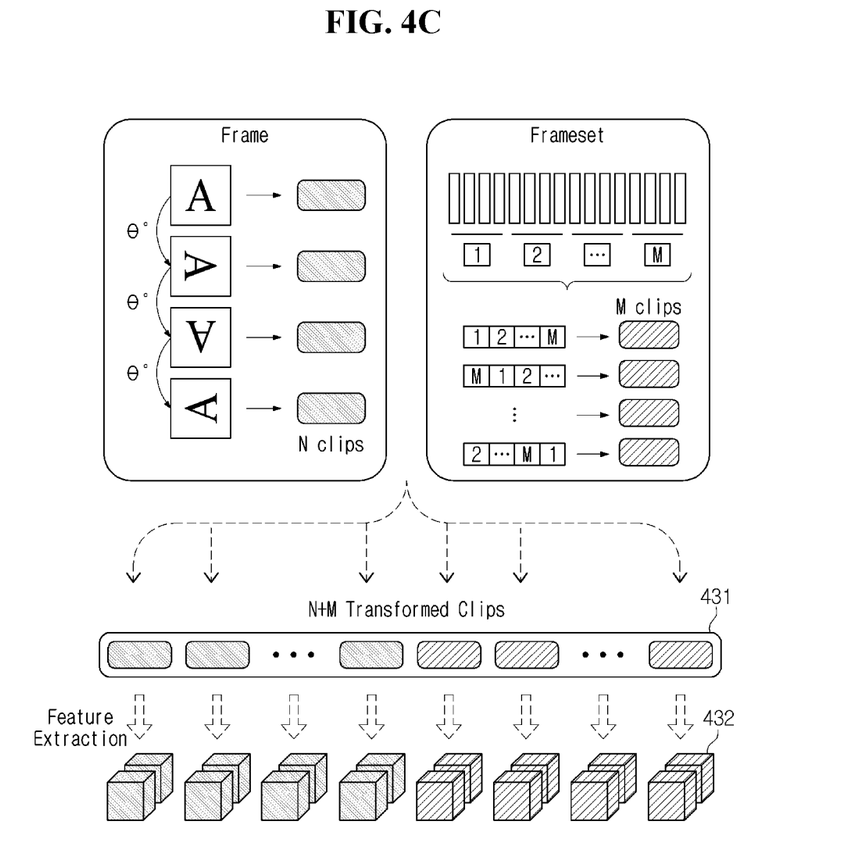
FIG. 4C is a diagram showing a process of extracting a 4-dimensional feature map.

FIG. 4C is a diagram showing a process of extracting a 4-dimensional feature map.

A feature map extraction process according to the present disclosure may be performed by inputting clips 431 subjected to spatio-temporal transformation to an image/video feature extraction network. Accordingly, a plurality of 4D feature maps 432 may be extracted. Here, the collection of the extracted feature maps 432 may be expressed as [Equation 1].

$$F=\{f_{h,w,t,c}^{(i)}\} \qquad \text{[Equation 1]}$$

Here, an index included in parentheses of Equation 1 means an order of each tensor in a bundle in which tensors of the same shape are bundled. Here, the tensor may mean an array of multidimensional data. That is, according to the present disclosure, the tensor may mean an array of multi-dimensional feature map data. In addition, an index outside parentheses means an index for accessing an element of an individual tensor. Specifically, i means the i-th spatio-temporal transformation. In addition, h, w, t, and c represent height, width, time, and channel index, respectively.

Figure 4D:
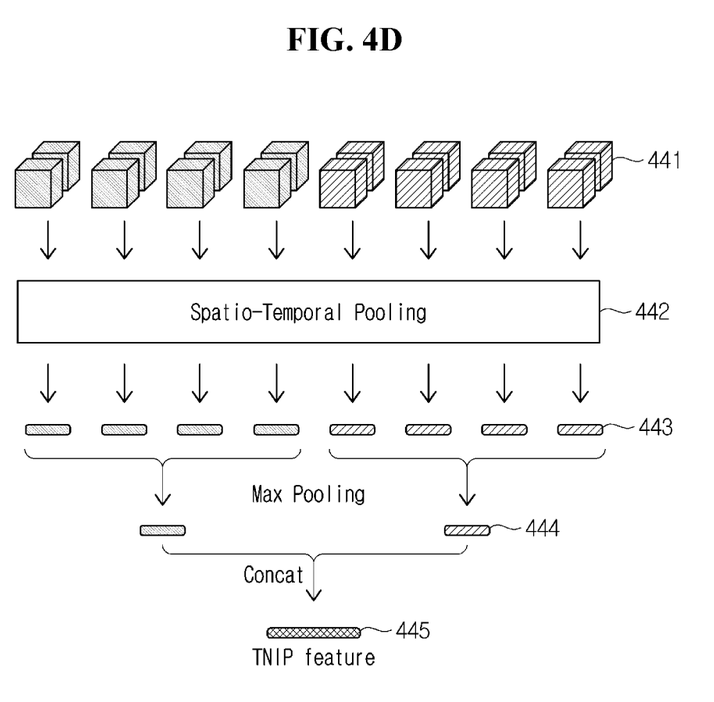
FIG. 4D is a diagram showing a process of performing TNIP.

FIG. 4D is a diagram showing a process of performing TNIP.

A process of performing TNIP according to the present disclosure may mean a series of pooling processes. Specifically, the device may perform spatio-temporal pooling 442 on the feature maps 441. Thereafter, an image/video feature descriptor 444 may be extracted by performing max pooling on the data 443 for which spatio-temporal pooling has been performed. Here, the maximum pooling refers to an operation of subtracting a maximum value among values within a window. However, according to another embodiment of the present disclosure, p-norm pooling may be performed on data 443 on which spatio-temporal pooling is performed, but the present disclosure is not limited thereto. Finally, the device may extract a final image/video feature descriptor (TNIP feature) 445 by concatenating an image/video feature descriptor 444.

According to an embodiment of the present disclosure, after extracting TNIP image/video feature descriptors for each of the N clips obtained through spatial transformation and the M clips obtained through temporal transformation, a final TNIP image/video feature descriptor may be extracted by concatenating them. In this case, a size of a TNIP image/video feature descriptor may be 2×C. Here, C may be a size of a 4-dimensional feature map in a channel direction. A more specific feature map 441 spatio-temporal pooling 442 process will be described later with reference to FIG. 4E.

Figure 4E:
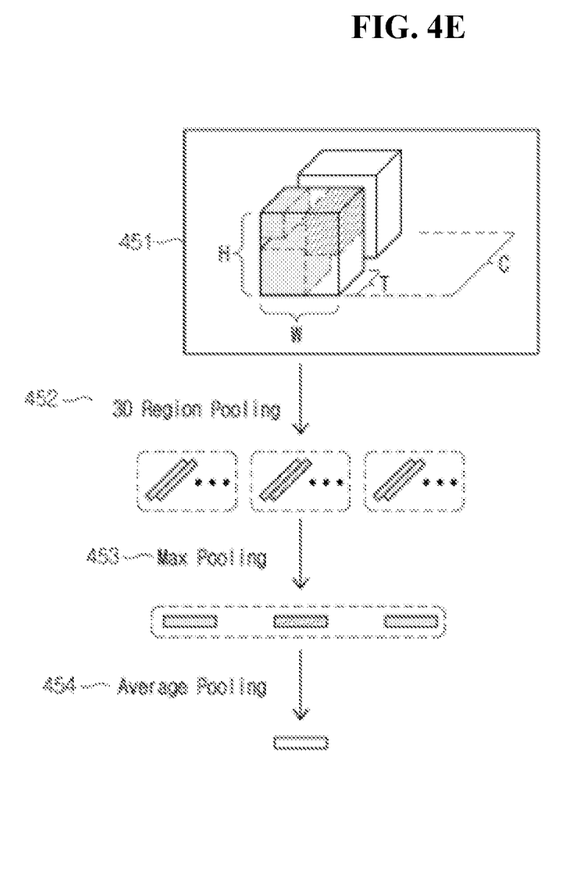
FIG. 4E is a diagram showing a specific process of performing spatio-temporal feature pooling for individual clips.

FIG. 4E is a diagram showing a specific process of performing spatio-temporal feature pooling for individual clips.

A process of performing spatio-temporal feature pooling according to the present disclosure may be a process of performing a series of poolings for each feature map 451. Specifically, in a 3D Region Pooling 452, spatio-temporal region pooling, intra-scale pooling, and multi-scale pooling may be sequentially performed. In addition, the pooling processes may be performed through a p-norm pooling operation corresponding to individual a p value. However, the present disclosure is not limited to the above pooling order, and at least one of spatio-temporal region pooling, intra-scale pooling, or multi-scale pooling may be performed.

Figure 5:
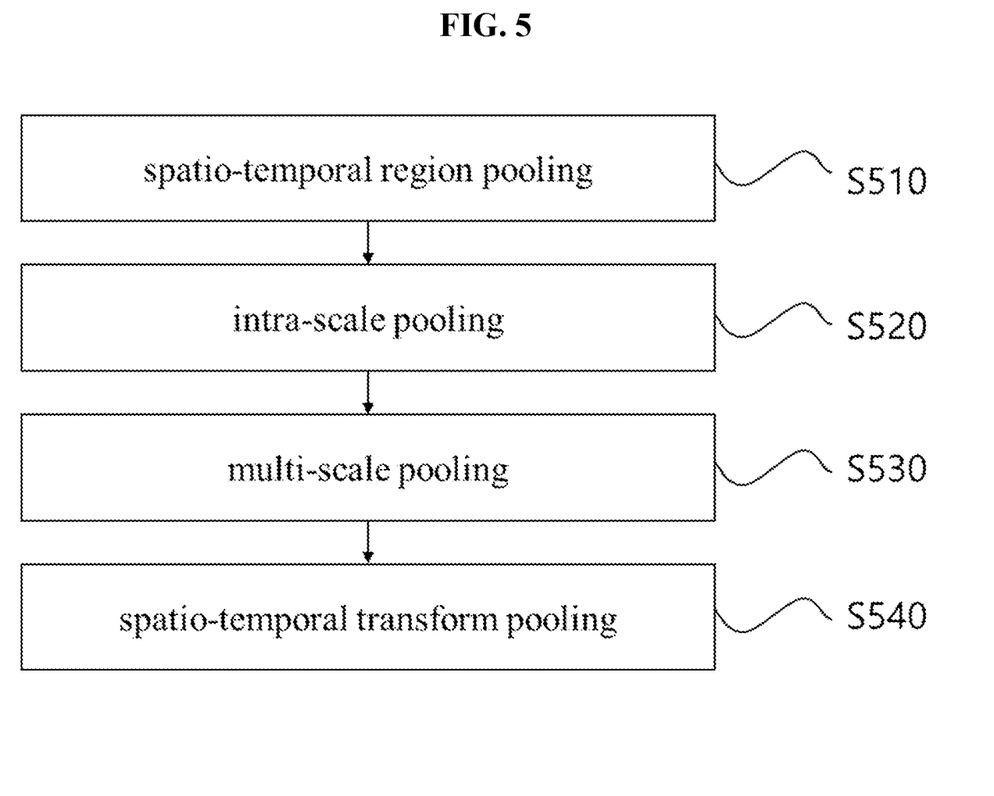
FIG. 5 is a diagram showing a process of extracting a TNIP feature extraction.

FIG. 5 is a diagram showing a process of extracting a TNIP feature extraction.

TNIP feature extraction according to the present disclosure may include four pooling processes. Specifically, spatio-temporal region pooling (S510), intra-scale pooling (S520), multi-scale pooling (S530), and spatio-temporal transform pooling (S540) may be sequentially performed.

Referring to FIG. 5, spatio-temporal region pooling (S510) is a process of performing pooling while sweeping a predefined window (e.g., window (Hw, Ww, Tw)) along a space-time axis. Here, two or more different space-time windows may be used as a window, and in this case, a sweep may be performed for each window. Specifically, pooling for a given space-time window may be expressed as p-norm pooling (default: p=2) such as Equation 2.

$$f^{(i,\sigma)}_{(h_0,w_0,t_0),c} =$$ [Equation 2]

-continued $$\left[\frac{1}{H_\sigma W_\sigma T_\sigma} \sum_{h=h_0-H_\sigma/2}^{h_0+H_\sigma/2} \sum_{w=w_0-W_\sigma/2}^{w_0+W_\sigma/2} \sum_{t=t_0-T_\sigma/2}^{t_0+T_\sigma/2} \left(f^{(i)}_{h,w,t,c}\right)^p\right]^{1/p}$$

Here, h0, w0, and t0 denote the location of a center point of a window. In addition, σ denotes an index of a space-time window, and Hσ, Wσ, and Tσ denote the width, height, and length of a σ-th window.

Intra-scale pooling (S520) may be combined into a single C-dimensional vector by applying p-norm pooling (default: p=∞) to a spatio-temporal region pooled C-dimensional vectors for each space-time window index G. Here, C means a channel direction size of a 4-dimensional feature map. The p-norm pooling (default: p=∞) may be expressed as Equation 3.

$$f^{(i,\sigma)}_c = \left[\frac{1}{H_s W_s T_s} \sum_{h_0} \sum_{w_0} \sum_{t_0} \left(f^{(i,\sigma)}_{(h_0,w_0,t_0),c}\right)^p\right]^{1/p}$$ [Equation 3]

Here, Hs, Ws, and Ts denote window sweep indices. Through an intra-scale pooling (S520), all scales may be considered with the same weight in a subsequent multi-scale pooling (S530).

In a multi-scale pooling (S530), a C-dimensional vector may be obtained by p-norm pooling (default: p=1) of vectors subjected to an intra-scale pooling (S520) for all window scales. The p-norm pooling (default: p=1) may be expressed as Equation 4.

$$f^{(i)}_c = \left[\frac{1}{S} \sum_\sigma \left(f^{(i,\sigma)}_c\right)^p\right]^{1/p}$$ [Equation 4]

Here, S means the number of space-time window scales.

In the last step, spatio-temporal transform pooling (S540), a final TNIP image/video feature descriptor may be obtained by performing p-norm pooling (default: p=∞) of multi-scale pooled (S530) vectors for different spatio-temporal transform indices. Here, p-norm pooling (default: p=∞) may be expressed as Equation 5.

$$f^{TNIP}_c = \left[\frac{1}{N} \sum_i \left(f^{(i)}_c\right)^p\right]^{1/p}$$ [Equation 5]

Here, N means a total number of spatio-temporal transformations. This vector may be additionally dimensionally reduced or, conversely, embedded in a high-dimensional space and converted to a desired size.

According to an embodiment of the present disclosure, when spatio-temporal transforms may be divided into two or more groups, a device may perform spatio-temporal pooling for each group. As described above, according to the present disclosure, a plurality of group TNIP image/video feature descriptors may be obtained by performing spatio-temporal pooling for each group, and then a final TNIP image/video feature descriptor may be obtained by concatenating them. For example, the device may extract group TNIP image/video feature descriptors for each of a spatial transform group and a temporal transform group. Each group TNIP picture feature descriptor may be obtained by Equation 6. Here, g means each group. TNIP image/video feature descriptors of each group obtained in this way are concatenated by the following Equation 7 to obtain a final TNIP image/video feature descriptor. In this case, a size of a TNIP image/video feature descriptor may be G×C.

$$f_c^{(g)} = \left[\frac{1}{N}\sum_{i \in G_g} (f_c^{(i)})^p\right]^{1/p} \quad \text{[Equation 6]}$$

$$f_c^{TNIP} = [f_c^{(1)} \cdots f_c^{(G)}] \quad \text{[Equation 7]}$$

Figure 6:
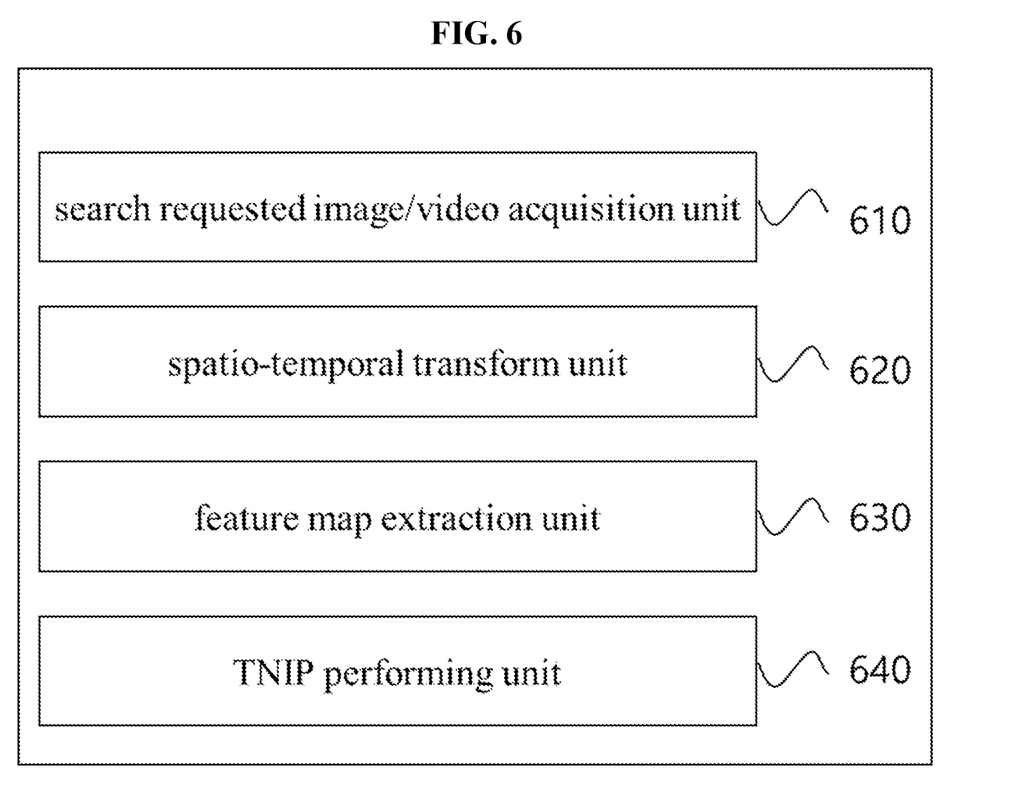
FIG. 6 is a diagram showing an image/video feature descriptor extraction device.

FIG. 6 is a diagram showing an image/video feature descriptor extraction apparatus according to the present disclosure. The image/video feature extraction device may include a search requested image/video acquisition unit 610, a spatio-temporal transform unit 620, a feature map extraction unit 630, and a TNIP performing unit 640.

Referring to FIG. 6, a search requested image/video acquisition unit 610 may acquire a search requested image/video from an user. All or part of the search requested image/video acquired by the device may be a collection of short images or a short video having a fixed length. In addition, a search requested image/video referred to in the present disclosure may be referred to as 'Query' or another term having an equivalent technical meaning. In addition, short images or a short video referred to in the present disclosure may be referred to as a 'clip' or another term having an equivalent technical meaning.

A spatio-temporal transform unit 620 may perform spatio-temporal transformation of the search requested image/video acquired by the device. Spatio-temporal transformation of the search requested image/video may be performed through a collection of predefined image/video transformation functions. In addition, a Spatio-temporal transformation may include one of a spatial transformation, a temporal transformation, or a combination of the two transformations.

A feature map extraction unit 630 may extract a feature map for each of spatio-temporal transformed clips. Specifically, each of the spatio-temporal transformed clips may be input to an image/video feature extraction network. In this case, all of the image/video feature extraction networks may be the same network, but are not limited thereto. Accordingly, the feature map extraction unit 630 may extract a plurality of 4D feature maps.

A TNIP performing unit 640 may perform TNIP on the feature map. Specifically, a TNIP performing unit 640 may extract an image/video feature descriptor by applying TNIP to feature maps. Here, TNIP may be a series of pooling operations applied to feature maps. In addition, the series of pooling operations may mean sequentially proceeding spatio-temporal region pooling, intra-scale pooling, multi-scale pooling, and spatio-temporal transform pooling. However, the present disclosure is not limited to the pooling sequence, and the series of pooling operations may mean performing at least one of spatio-temporal region pooling, intra-scale pooling, multi-scale pooling, or spatio-temporal transform pooling.

Figure 7:
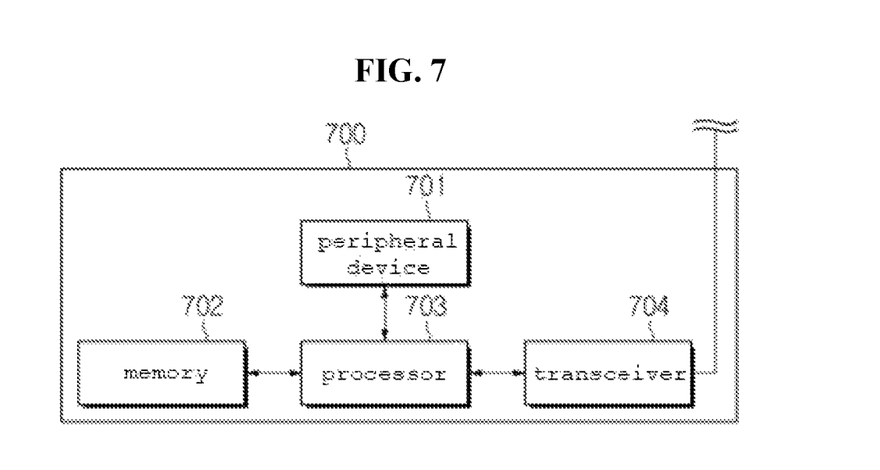
FIG. 7 is a diagram showing a device configuration to which an image/video feature descriptor extraction apparatus for image/video search is applied.

FIG. 7 is a block diagram of a device 700 including an image/video feature descriptor extraction function according to an embodiment of the present disclosure. In relation to this, a device 700 of FIG. 7 may be one of various user devices including an image/video feature descriptor extraction function. In addition, a device 700 of FIG. 7 may be a server 120 or user devices 110*a* and 110*b* of FIG. 1. For example, a device 700 of FIG. 7 may be a smart phone, a wearable device, a laptop computer, a PC, a monitoring device, a server, and the like.

A device 700 including an image/video feature descriptor extraction function according to the present disclosure may include a peripheral device 701, a memory 702, a processor 703, and a transceiver 704. At this time, as an example, a peripheral device 701 may include at least one of a device for inputting a search requested image/video, a device for performing spatio-temporal transformation, a device for extracting a feature map, or a device for performing TNIP according to the present disclosure. In addition, a peripheral device 701 may include other devices, and is not limited to the above-described embodiment.

The memory 702 is a storage device capable of storing information. Memory 702 may include read only memory (ROM) and random access memory (RAM). Here, RAM may load data, do what it needs to do, and store changes back. ROM is a read-only storage device, and data stored in ROM can be stored permanently or semi-permanently. In addition, a memory 702 may store other related information.

A processor 703 is hardware having a function of processing and/or processing various types of information within a device 700. A processor 703 may be a central processing unit (CPU), a memory 702, and/or a semiconductor device that executes instructions stored in a storage device. For example, a processor 703 may perform an image/video feature descriptor extraction process disclosed in FIGS. 3 to 5 described above.

A transceiver 704 may transmit information stored in the memory. That is, a transceiver 704 may be a component for transmitting and receiving data or information. In addition, it may be a data transmission device for exchanging data with other devices or systems in data communication. A transceiver 704 may include a data input/output device or a communication control device. For example, a transceiver 704 may enable communication of voice, image/video, and text data between the data system and other devices.

What is claimed is:

1. A method of extracting video feature descriptors of a video, comprising:
   obtaining the video including a plurality of frames;
   obtaining a plurality of clips of the video by performing spatio-temporal transformation on the video, the spatio-temporal transformation including spatial transformation on the video and temporal transformation on the video;
   extracting feature maps from the plurality of clips, the feature maps being 4-dimensional feature maps expressed by elements of height, width, time, and channel index for the feature maps; and
   extracting the video feature descriptors by applying TNIP (Temporal Nested Invariance Pooling) to the feature maps,
   wherein the plurality of clips includes first clips obtained by the spatial transformation and second clips obtained by the temporal transformation,
   wherein the spatial transformation comprises dividing the video into N clips and obtaining the first clips by rotating the N clips, a number of the first clips being N,
   wherein the temporal transformation comprises dividing the video into M clips and obtaining the second clips by circularly shuffling the M clips, a number of the second clips being M,
   wherein a number of the plurality of clips obtained by performing the spatio-temporal transformation is N+M, N being different from M, and
   wherein TNIP is applied by using a center point of a space-time window and an index of the space-time window, the space-time window being predefined by a width, a height, and a length of the space-time window.

2. The method of claim 1,
wherein TNIP includes spatio-temporal region pooling, intra-scale pooling, multi-scale pooling, and spatio-temporal transform pooling.

3. The method of claim 2,
wherein the spatio-temporal region pooling uses two or more different space-time windows.

4. The method of claim 2,
wherein the spatio-temporal region pooling performs p-norm pooling (default: p=2) for the space-time window.

5. The method of claim 2,
wherein the intra-scale pooling performs p-norm pooling (default: p=∞) again on vectors pooled by the spatio-temporal region pooling.

6. The method of claim 2,
wherein the multi-scale pooling performs p-norm pooling (default: p=1) on vectors pooled by the intra-scale pooling for all window scales.

7. The method of claim 2,
wherein the spatio-temporal transform pooling performs p-norm pooling (default: p=∞) on vectors pooled by the multi-scale pooling for different spatio-temporal transform indices.

8. An apparatus including a processor executing instructions from a memory to extract video feature descriptors of a video, comprising:
a video acquisition part, executed by the processor, that obtains the video including a plurality of frames;
a spatio-temporal transformation part, executed by the processor, that obtains a plurality of clips of the video by performing spatio-temporal transformation on the video, the spatio-temporal transformation including spatial transformation on the video and temporal transformation on the video;
a feature map extraction part, executed by the processor, that extracts feature maps from the plurality of clips, the feature maps being 4-dimensional feature maps expressed by elements of height, width, time, and channel index for the feature maps; and
a TNIP performing part, executed by the processor, that extracts the video feature descriptors by applying TNIP (Temporal Nested Invariance Pooling) to the feature maps,
wherein the plurality of clips include first clips obtained by the spatial transformation and second clips obtained by the temporal transformation,
wherein the spatial transformation comprises dividing the video into N clips and obtaining the first clips by rotating the N clips, a number of the first clips being N,
wherein the temporal transformation comprises dividing the video into M clips and obtaining the second clips by circularly shuffling the M clips, a number of the second clips being M,
wherein a number of the plurality of clips obtained by performing the spatio-temporal transformation is N+M, N being different from M, and
wherein TNIP is applied by using a center point of a space-time window and an index of the space-time window, the space-time window being predefined by a width, a height, and a length of the space-time window.

9. The apparatus of claim 8,
wherein the TNIP includes spatio-temporal region pooling, intra-scale pooling, multi-scale pooling, and spatio-temporal transform pooling.

* * * * *